United States Patent Office 3,095,733
Patented July 2, 1963

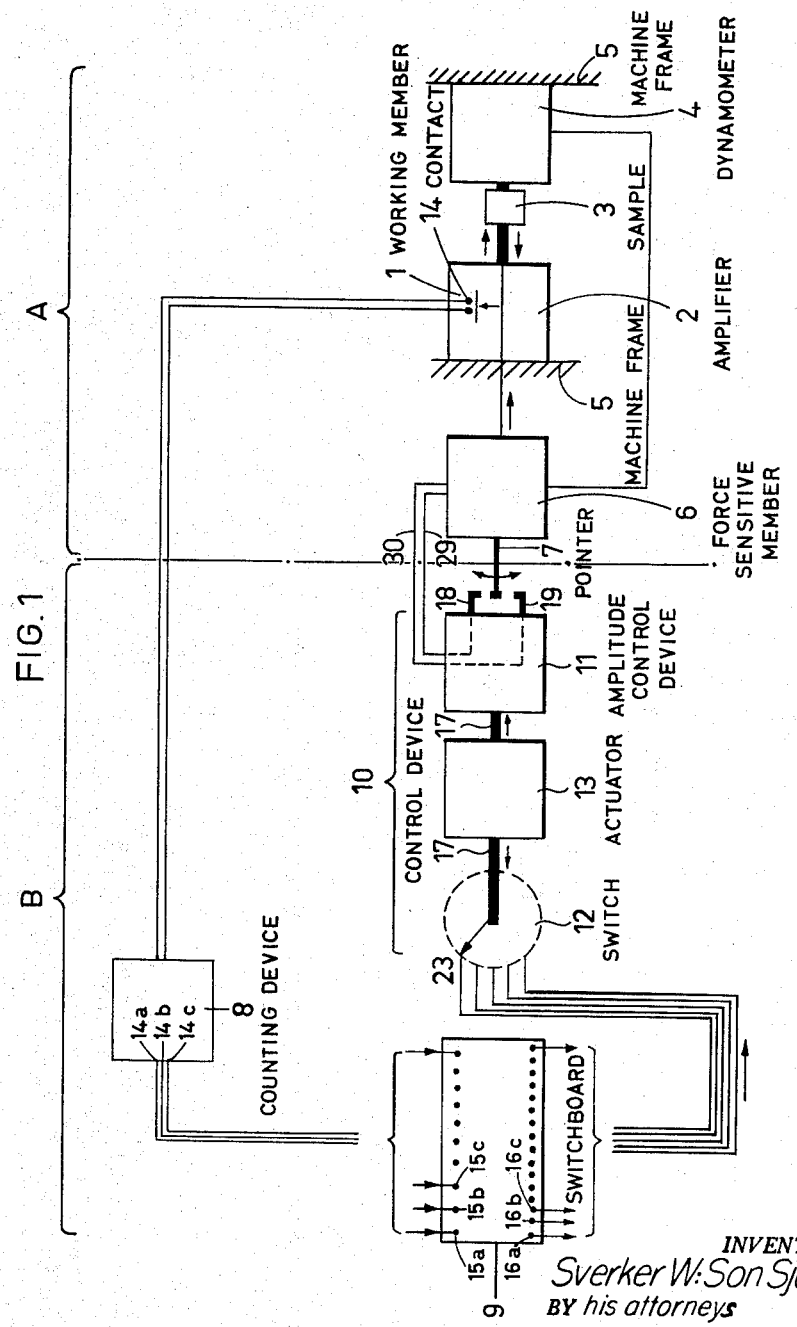

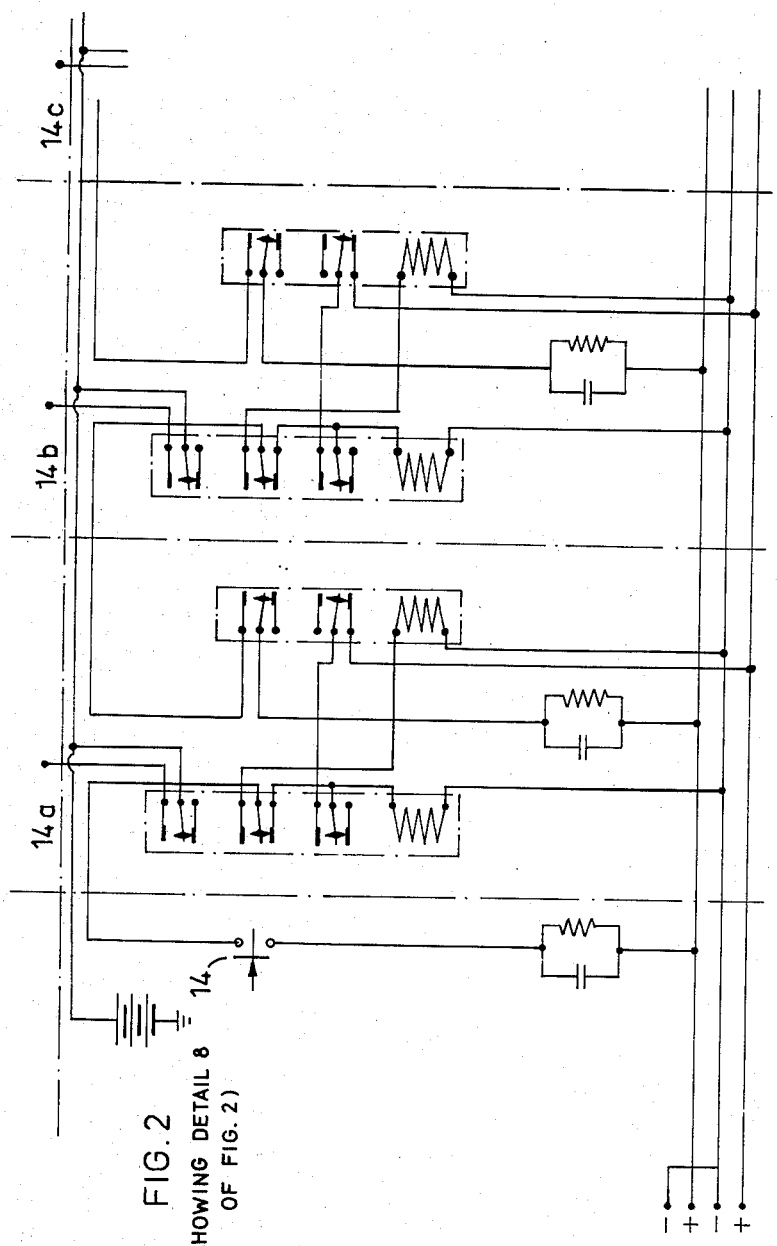

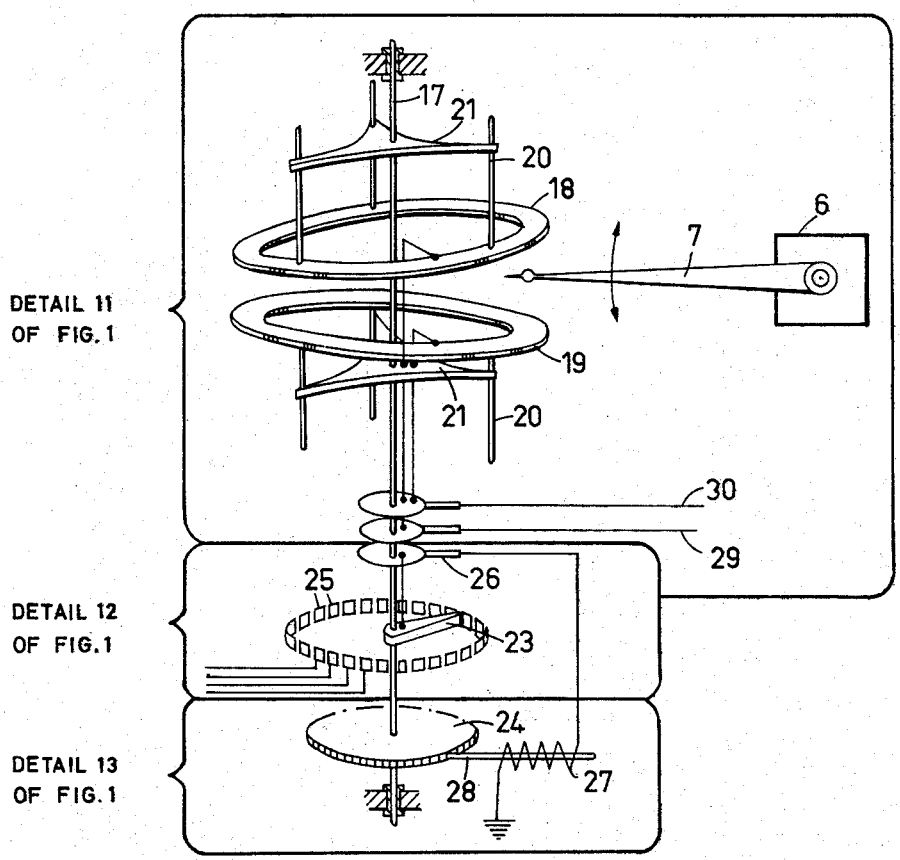

3,095,733
DEVICES FOR AUTOMATIC CONTROL OF A MACHINE IN ACCORDANCE WITH A PREDETERMINED PROGRAM
Sverker W:son Sjöström, Varsta, Sweden, assignor to Aktiebolaget Scania-Vabis, Sodertalje, Sweden, a corporation of Sweden
Filed Oct. 22, 1957, Ser. No. 691,695
5 Claims. (Cl. 73—91)

This invention relates to a device for automatic control of a machine in accordance with a predetermined program, this device being of the type which after the machine has performed a series of mutually equal operations adjusts the machine so as to perform a series of mutually equal operations which differ from the preceding operations. In particular, but not exclusively, the device according to the invention is intended to control machines for testing the resistance to fatigue of machine parts or similar members, but may also be applied to other types of machines to meet the above-named performance requirements. The object of the invention is to provide a device of the type referred to which is considerably simpler in construction and more reliable in operation than devices hitherto used for this purpose.

The invention is described hereinbelow as applied to a machine for testing the resistance to fatigue. With a machine of this type it is possible to exert alternating stresses of predetermined magnitudes and predetermined relations of the number of alternating stresses of different magnitudes. A predetermined sequence or cycle of such a stress series with different magnitudes of the stresses in each series is termed hereinbelow a partial collective. The number of repeated sequences of partial collectives required to fatigue the sample until it fractures is termed hereinbelow a collective.

When a fatigue test program is to be drawn up for a certain machine part it is first necessary to investigate the nature of the occurrence of the stresses in practical service. To this end the amplitudes of the actual alternating stresses as well as the frequency of the different amplitudes are to be recorded during a certain period of time by means of suitable instruments. For the interpretation of the results of the test it is suitable, for practical reasons, to put certain amplitudes together in groups and to draw up a program for a cycle or partial collective based on such groups. The automatic program-making device of the fatigue testing machine is then adjusted for such partial collective, and the machine repeats this partial collective cycle until the sample is finally fatigued.

The program-making device of a fatigue testing machine of known type includes a plurality of mechanically operated counting devices, an automatic force controlling device and an automatic switch member.

The counting devices (one for each series of similar alternating stresses) are initially adjusted for the number of stresses of the respective series. Each counting device serves to give a signal to the force control member at the end of a series of alternating stresses such as to switch over to another magnitude of stresses. Simultaneously the next counting device is started to count a new series of alternating stresses. The counting devices are constructed to count backwards. The signals to the force control member are emitted in the zero-position. By means of electric motors, the counting devices are readjusted for counting the series of a new partial collective.

The force control member serves to maintain the amplitudes of the stresses at a constant value during a series of alternating stresses and to adjust the amplitude in accordance with the program upon transition to the next series. In principle, the control of the force is effected in a manner such that alternating stresses transmitted by the machine to the sample are also transmitted to a spring dynamometer arranged in series with the sample. The deflection of the dynamometer is amplified by a force sensitive member and transmitted to a pointer which oscillates between two contacts. The pointer and the contacts are connected to electric circuits. As the pointer oscillates between the contacts, alternating circuits are closed which acuate the machine control which in turn varies the amplitude such that the pointer just touches the contacts. Consequently, the positions of the contacts determine the limits of the stress range.

The automatic switch member is started upon an impulse from any of the counting devices when a series of stresses is to be discontinued and another series is to be started. At the switching moment a new pair of contacts having a different spacing is advanced. The oscillating pointer associated with the force sensitive member then adjusts the machine controls for a different amplitude. Each shifting between a series of alternating stresses and another series having a greater or lesser amplitude is consequently effected entirely automatically as a result of impulses from the counting devices in accordance with the predetermined program.

The device according to the invention is distinguished from previously known devices by the fact that it comprises a single counting device for counting the operations and which after a predetermined number of operations gives an impulse for adjusting the machine and is itself adjusted in such a manner as to give a new impulse for adjusting the machine after another predetermined number of operations.

In the drawing, FIG. 1 is a diagrammatic view of a fatigue testing machine A of known construction, the usual program-making device being replaced by a device B according to the invention. FIG. 2 is a wiring diagram for the binary-scale counting device 8 shown in the device B of FIG. 1, and FIG. 3 is a partial diagrammatic view of a device for the control of the machine.

Referring to FIG. 1, reference letter A denotes an assembly of members usually used in fatigue testing machines. The machine comprises a working number 1 which in cooperation with an amplifier 2 exerts alternating stresses upon a sample 3 which is thus alternatingly strained. If desired, the sample may be prestressed. A dynamometer 4 inserted between the sample 3 and the frame 5 of the machine measures the initial stress and the alternating stresses. The measured values are amplified in a force sensitive member 6 provided with a pointer 7.

The automatic program-making device according to the invention is generally indicated at B in FIG. 1. Said device comprises a counting device 8, a switchboard 9 for selecting a program and a device 10 for the control of the machine. The device 10 comprises an amplitude control member 11, a switch 12 and an advancing device 13. The following description of FIGS. 1 and 3 explains the mechanical and electrical connections of these elements.

In FIG. 1, mechanical connections between the various parts are indicated by double shaded black lines and electrical connections by light lines. Within the scope of the invention, the electrical connections may be replaced by mechanical connections.

A suitable type of an impulse reduction means is illustrated in FIG. 2 which diagrammatically shows an embodiment of a binary-scale counting device or a so-called bniary-scale relay comprising a series of electromagnetic relays. Each one hundredth movement of the working member 1 shown in FIG. 1 is electrically transmitted as an input signal to the device 8. As shown in FIG. 2, the device 8 comprises a plurality of lines (14a, b, c etc.)

for output signals having reduced frequencies. Consequently, it is possible to obtain output frequencies equal to 1/1, 1/2, 1/4, 1/8 etc. of the input frequency.

Each change of stress in the machine is counted by a counting means associated with the working member 1. Upon each hundredth change, the said counting means sends a signal to the device 8 by closing a contact 14 (FIGS. 1 and 2) of a circuit of the relay. For instance, if it is desired to discontinue a series of alternating stresses after $100 \times 2^{10} = 102,400$ stresses having a certain amplitude, that line of the device 8 is used for shifting to the next following series which gives one output signal after $2^{10}$ input signals. If say $100 \times 2^{12}$ alternations are desired for the new series, that line is used for this series which gives one output signal after $2^{12}$ input signals. The governing effect of the output signals is used in the control device 10 to be described later on with reference to FIG. 3. Before the signals arrive at the control device 10 they have to pass through the switchboard 9.

In the switchboard the program for the fatigue test is selected. It is the purpose of the switchboard to transmit, in accordance with a certain program, output signals from the binary-scale device 8 to selected actuator contacts in the switch 12 comprised in the control device 10. As shown in FIG. 1, the switchboard 9 has a plurality of contact screws 15a, b, c etc. for connection with the output lines of the device 8 and contact screws 16a, b, c etc. for connection with the respective actuator contact sectors of the switch 12. The connections with the device 8 and the switch 12 may be permanent.

The selected contact screws 15a, b, c etc. and 16a, b, c etc. are connected with each other by means of loose cords. If it is desired to have the same number of alternating stresses in a plurality of series with different magnitudes of stresses, one of the terminals 15a, b, c, etc. is to be connected with a plurality of the terminals 16a, b, c, etc.

The control device indicated at 10 in FIG. 1 is illustrated in greater detail and somewhat diagrammatically in FIG. 3 which represents one of a plurality of possible forms of construction. According to FIG. 3, the amplitude control device 11 (cf. FIG. 1) comprises two contact rings 18 and 19 which are supported at three points and which are coaxial with respect to each other and to a rotary shaft 17 and arranged to rotate together with said shaft. By means of screws 20 provided on webs 21 secured to the shaft 17, the contact rings may be placed, within certain limits, at pre-selected angles with respect to the shaft 17 and with respect to each other. Upon rotation of the shaft the two contact rings form a pair of contacts having a continuously variable distance between each other at their circumferences. The pointer 7 connected to the force sensitive member 6 is arranged to oscillate between the rings 18 and 19. When the pointer contacts the rings, circuits will be closed which (in a similar manner to the above-indicated amplitude control device of known type having step-wise advanced pairs of contacts), via the force sensitive member 6, actuate the working member 1 of the machine to maintain a stress amplitude corresponding to the contact spacing.

The shaft 17 has further mounted thereon the movable member or feeler 23 of switch 12 which, by means of a ratchet wheel 24 also mounted on the shaft and belonging to actuator 13, is step-wise moved into contact with a plurality of the annularly arranged actuator contacts 25. By means of a brush contact 26 mounted on the shaft 17, the switch member 23 is electrically connected is series with a solenoid coil 27 which by means of a push rod 28 turns the wheel 24 step-wise in correspondence to the locations of the actuator contacts 25.

By means of brush contacts 29, 30, the contact rings 18, 19 are electrically connected with the force sensitive member 6, FIG. 1.

The various parts of the control device 10 are housed in a casing not shown in the drawing.

The main advantage of the contact rings of the control device consists in the practically continuously variable adjustment of the contact spacing in a very simple manner as compared with devices of known type including a great number of pairs of contacts.

The use of a binary-scale counting device results in a very simple and reliable impulse reduction member as compared with hitherto used mechanical counting devices.

Referring to FIGS. 1, 2 and 3, a fatigue test is carried out in the following manner. To begin with, a machine part or other sample is tested under actual service conditions to ascertain a suitable series of stress magnitudes and a number of alternations within the same magnitude, that is, a partial collective. The output lines of the counting device 8 (FIG. 1), that is, the binary-scale relay, are connected by means of the switchboard 9 (FIG. 1) with appropriate actuator contacts 25 (FIG. 3) of the switch 12 (FIG. 1) of the control device 10 (FIG. 1). The sample 3 (FIG. 1) is placed on the machine A (FIG. 1) and prestressed in case of initial stress in actual service.

It has proved suitable to begin the test with stresses of medium magnitude. To this end, the contact rings 18, 19 (FIG. 3) of the amplitude control device 11 (FIG. 1) should, to begin with, be adjusted such that the pointer 7 is given a freedom of movement corresponding to said magnitude. By variation of the frequency of the stresses there is obtained, due to resonance effect, an amplification such that the pointer 7 (FIG. 3) will touch the contact rings 18, 19. The resulting pulses through the force sensitive member 6 (FIG. 1) are used to stabilize, via the working member 1, the amplitude of the alternating stresses exerted upon the sample.

For each hundredth alternating stress the counting means of the working member sends an input signal to the binary-scale counting device 8 (FIG. 1). As soon as a sufficient number of such input signals have been received, the counting device will emit an output signal or pulse which via the switchboard 9 (FIG. 1) is transmitted to that actuator contact 25 (FIG. 3) of the switch 12 (FIG. 1) which corresponds to the stress magnitude defined by the contact rings 18, 19 (FIG. 3). Via the switch member 23, brush contact 26 and coil 27, this pulse actuates the push rod 28 (FIG. 3) which advances the wheel 24 through one step. At the same time, the switch member 23 which is mounted on the same shaft 17 as the wheel 24 (FIG. 3) will be angularly moved one step to the next actuator contact 25. Simultaneously, the contact rings 18, 19 (FIG. 3) will be turned by the shaft 17 into new positions in which their spacing is altered. The deflection of the pointer 7 (FIG. 3) adapts itself to the new spacing of the contacts. As a result thereof, the force sensitive member 6 (FIG. 1) will stabilize a new magnitude of stresses during the following series of stresses. After the contact rings have been turned one full revolution, corresponding to a partial collective, new partial collectives will be automatically repeated until the desired result of the test has been obtained.

What I claim is:

1. A device for automatic control of a machine in accordance with a predetermined program comprising a single counting device for counting a series of mutually equal operations of the machine and then emitting an impulse, a control device connected to the machine to change the mode of operation thereof upon receipt of an impulse from said counting device, an actuator connected to said control device and to said counting device and controlled by impulses received from said last named device, said actuator being adapted, upon receipt of an impulse to adjust said counting device to emit the next impulse after another, but different, predetermined number of mutually equal operations different from the preceding series.

2. A device for automatic control of a predetermined program of a machine in accordance with claim 1 in which the single counting device is of the electric type, there are output contacts in said counting device arranged to emit impulses after different numbers of operations, and a switchboard connected to said contacts, in combination with actuator contacts in said control device connected to said output contacts through said switchboard, and a feeler in the control device associated with the actuator contacts adapted to be moved to another actuator upon receipt of an impulse from said counting device in order to cause the machine to perform another number of mutually equal operations.

3. A device for automatic control of a predetermined program of a machine in accordance with claim 2 in which said control device comprises an intermittently rotatable shaft, the feeler for the actuator contacts being on the shaft and the actuator contacts annularly arranged around the feeler, there also being in the control device a solenoid coil in series with said feeler, means associated therewith to turn the shaft intermittently, and further means connected with the shaft for changing the mode of operation of the machine.

4. A device as claimed in claim 3 for controlling a machine for testing the resistance to fatigue of a part sample to be tested in accordance with a predetermined program so as to exert upon said sample alternating stresses of predetermined magnitudes and predetermined relations of the number of alternating stresses of different magnitudes, there being two contact rings axially displaceable relatively to each other and differently spaced from each other at their circumferences, the rings being mounted on the said intermittently rotatable shaft, there being an oscillatory contact arm responsive to the alternations of the stresses which project between the rings, the amplitude of the oscillations being a measure of the magnitude of the stresses, in combination with a reversing means adapted to receive impulses for reversing the direction of the stresses upon contact of said arm with said contact rings.

5. A device for automatic control of a predetermined program of a machine in accordance with claim 1 wherein the counting device is of the binary-scale type.

References Cited in the file of this patent

UNITED STATES PATENTS

| | | |
|---|---|---|
| 2,373,351 | Sims | Apr. 10, 1945 |
| 2,496,632 | Lazan | Feb. 7, 1950 |
| 2,784,582 | Hartung et al. | Mar. 12, 1957 |
| 2,828,622 | Gross et al. | Apr. 1, 1958 |

FOREIGN PATENTS

| | | |
|---|---|---|
| L 15162 | Germany | May 30, 1956 |